United States Patent [19]

Sayles

[11] Patent Number: 4,983,321

[45] Date of Patent: Jan. 8, 1991

[54] CORROSION PREVENTION CONSTITUENT FOR SURFACE COATINGS

[75] Inventor: David C. Sayles, Huntsville, Ala.

[73] Assignee: United States of America, as represented by the Secretary of the Army, Washington, D.C.

[21] Appl. No.: 362,556

[22] Filed: Jun. 5, 1989

[51] Int. Cl.$^5$ .......................... C09K 3/00; C04B 9/02; C09D 5/08

[52] U.S. Cl. .................................. 252/387; 252/389.4; 252/389.51; 252/289.61; 106/14.05; 106/14.27; 106/1.17

[58] Field of Search .................. 106/14.05, 14.27, 1.17, 106/38.7; 252/389.4, 389.51, 389.61

[56] References Cited

U.S. PATENT DOCUMENTS

| | | | |
|---|---|---|---|
| 3,711,420 | 1/1973 | Jones | 252/389.51 X |
| 4,108,811 | 8/1978 | Eckhoff | 524/405 |
| 4,304,707 | 12/1981 | Kuehn | 252/389.61 X |
| 4,462,829 | 7/1984 | Heiss | 106/14.05 |
| 4,789,566 | 12/1988 | Tatsuno et al. | 427/388.2 |

Primary Examiner—Robert L. Stoll
Assistant Examiner—Cynthia Harris

[57] ABSTRACT

A corrosion-preventing soyabean-glycerol alkyd resin is preprared by combining soyabean oil and glycerol in a reaction kettle, and after heating to about 400° F., fused litharge is loaded. The temperature is then increased to about 440° F. and held until a clear solution is formed. Phthalic anhydride is then loaded and heat gained cautiously to about 450° F. Butylphenol resin is loaded. Then China wood oil is loaded. A first carbon dioxide blow is commenced. Then a second carbon dioxide blow is initiated. The mixture is then cooled to about 425° F. and held. The mixture is dropped into xylene and thinned with Varnish Makers' and Painter's Naptha (petroleum thinner) prior to use with the barium metaborate corrosion preventer compound of this invention which was developed to replace chromium which has reduced availability due to exportation restrictions from the major supplier country. The corrosion prevention surface primer coating composition of this invention comprises a weight percent range of 30-32 of the above soyabean-glycerol alkyd resin; 36-38 weight percent barium metaborate; 6-7 weight percent phenol formaldehyde; metal compound additives of titanium dioxide 5-6 weight percent, black iron oxide 1-2 weight percent, magnesium silicate 5-7 weight percent, and aluminum silicate; of 0.3 to 0.6, pertroleum thinner 10.0-12.2 weight percent; butanol 0.4 to 0.8 weight percent; and napthenate drying agents 0.1 to 0.3 weight percent each of cobalt napthenate, manganese naphthenate, and iron napthenate.

2 Claims, No Drawings

CORROSION PREVENTION CONSTITUENT FOR SURFACE COATINGS

DEDICATORY CLAUSE

The invention described herein may be manufactured, used, and licensed by or for the Government for governmental purposes without the payment to me of any royalties thereon.

BACKGROUND OF THE INVENTION

Chromium has been extensively used in corrosive inhibiting compositions and mixtures. For example, zinc chromate, also known as pigment yellow 36, has been used as pigment in paints, varnishes, oil colors, linoleum, rubber etc.

With the reduced availability of chromium because of restrictions placed on its exportation by a principle supplier country, it becomes critical to develop alternate materials for use as corrosion-inhibiting ingredients in surface coatings for defense and commercial uses.

Therefore, an object of this invention is to provide a non-critical source of a corrosion preventer.

A further object of this invention is to provide a corrosion preventer compound which is easily formulatd into an alkyl resin used in the production of fast drying coatings for light metal alloys surfaces.

SUMMARY OF THE INVENTION

The corrosion preventer compound of this invention is barium metaborate which is formulated with a corrosion-preventing alkyd resin to yield a surface coating with improved corrosion resistance properties as compared with a similar primer coating employing the standard zinc chromate corrosion preventer.

The corrosion-preventing alkyd resin is further defined in Table I by the ingredients it contains and by the manufacturing procedure therefor set forth under Table I below.

TABLE I

COMPARISON AND METHOD OF MANUFACTURE OF A CORROSION - PREVENTING ALKYD RESIN

INGREDIENT/MANUFACTURE — WEIGHT

| PROCEDURE CHARACTERISTICS | (lbs) |
|---|---|
| INGREDIENTS | |
| Soyabean Oil | 175.0 |
| Glycerol | 90.5 |
| Fused litharge | .25 |
| Phthalic anhydride | 161.0 |
| Butylphenol resin | 13.5 |
| China wood oil | 88.5 |
| Xylene | 353.5 |
| Varnish Makers & Painters' Naptha (petroleum thinner) | 151.5 |

| MANUFACTURING PROCEDURE | | |
|---|---|---|
| TIME | TEMPERATURE | OPERATION |
| 0:00 | | Soyabean oil loaded into reaction kettle |
| | | Glycerol loaded |
| | | Heat on |
| 1:30 | 400° F. | Litharge loaded |
| 2:00 | 440° F. | Gained |
| 2:30 | 440° F. | Hold until clear solution formed |
| 2:30 | 430° F. | Phthalic anhydride loaded |
| 2:45 | 450° F. | Gained cautiously |
| 4:30 | 450° F. | Butylphenol resin loaded |
| 4:40 | 450° F. | China wood oil loaded |
| 4:50 | 450° F. | 20 CFM carbon dioxide blow |
| 5:20 | 450° F. | 30 CFM carbon dioxide blow Allowed to cool to 425° F. |
| 5:40 | 425° F. | Held until desired viscosity is obtained |
| 6:30 | 425° F. | Dropped into xylene Thinned with Varnish Makers' & Painters' Naphtha (petroleum thinner) |

DESCRIPTION OF THE PREFERRED EMBODIMENT

Barium metaborate is employed as corrosion preventer compound in a corrosion-resistant primer coat formulation set forth in Table II. The soyabean-glycerol alkyd resin employed in this formulation is prepared by the manufacturing procedure set forth in Table I hereinabove.

TABLE II

A COMPARISON OF THE COMPOSITION OF CORROSION - RESISTANT PRIMER COATS

| INGREDIENT | Parts by WEIGHT COMPOSITION A | % | Parts by WEIGHT COMPOSITION B | % Range | % |
|---|---|---|---|---|---|
| Zinc chromate | 74.3 | 37.15 | 0 | 0 | 0 |
| Barium metaborate (corrosion preventer compound) | 0 | 0 | 74.3 | 36.00–38.00 | 37.15 |
| Metal compound additives: | | | | | |
| Titanium dioxide | 10.9 | 5.45 | 10.9 | 5.00–6.00 | 5.45 |
| Black iron oxide | 2.9 | 1.45 | 2.9 | 1.00–2.00 | 1.45 |
| Magnesium silicate | 10.9 | 5.45 | 10.9 | 5.00–7.50 | 5.45 |
| Aluminum stearate | 1.0 | 0.50 | 1.0 | 0.30–0.60 | 0.50 |
| Phenol-formaldehyde dispersion resin | 13.2 | 6.60 | 13.2 | 6.00–7.00 | 6.60 |
| Soyabean-glycerol alkyd resin (TABLE I) | 62.2 | 31.10 | 62.2 | 30.00–32.00 | 31.10 |
| Petroleum thinner | 22.4 | 11.20 | 22.4 | 10.00–12.20 | 11.20 |
| n-Butanol | 1.3 | 0.65 | 1.3 | 0.40–0.80 | 0.65 |
| Napthenate drying agent: | | | | | |
| Cobalt naphthenate | 0.3 | 0.15 | 0.3 | 0.10–0.30 | 0.15 |
| Manganese naphthenate | 0.3 | 0.15 | 0.3 | 0.10–0.30 | 0.15 |
| Iron naphthenate | 0.3 | 0.15 | 0.3 | 0.10–0.30 | 0.15 |
| | | 100.00 | | | 100.00 |

The evaluation of surface coating composition A and composition B is set forth below under Table III.

TABLE III

| EVALUATION OF SURFACE COATINGS | |
|---|---|
| Surface | steel |
| Number of coats | 1 |
| Undercoat | none |
| Method of application | spray |
| Reducer | xylene |

Evaluation of the corrosion resistance of these primers was carried out by spraying, after thinning with xylene, to spray viscosity, of one coat (4-mil thickness) onto bonderized steel panels. All surfaces were sprayed, including the edges of the panels. The panels were allowed to air-dry for 72 hours. The panels were then lowered into distilled water and allowed to remain until signs of corrosion were detected.

Composition A started to show signs of corrosion after 45 days, whereas Composition B did not show corrosion even after 60 days. At that time it was obvious that the test had effectively established the superior corrosion resistance of Composition B, and the test was discontinued.

I claim:

1. A corrosion prevention surface primer coating composition as specified in weight percent ranges set forth in Table II hereinbelow for the ingredients comprising a corrosion-preventing soyabean-glycerol alkyd resin; a corrosion preventer compound barium metaborate; a dispersion resin; metal compounds as additives; petroleum thinner; n-butanol, and napthenate drying agents, said corrosion-preventing soyabean-glycerol alkyd resin prepared from the ingredients and by the manufacture procedure set forth under Table I as follows:

TABLE I

| INGREDIENTS/MANUFACTURE PROCEDURE | | |
|---|---|---|
| INGREDIENTS | | WEIGHT (lbs) |
| Soyabean oil | | 175.0 |
| Glycerol | | 90.5 |
| Fused litharge | | .25 |
| Phthalic anhydride | | 161.0 |
| Butylphenol resin | | 13.5 |
| China wood oil | | 88.5 |
| Xylene | | 353.5 |
| Petroleum thinner | | 151.5 |

| MANUFACTURING PROCEDURE | | |
|---|---|---|
| TIME | TEMPERATURE | OPERATION |
| | | Soyabean oil loaded into reaction kettle |
| | | Glycerol loaded |
| 0:00 | | Heat on |
| 1:30 | 400° F. | Litharge loaded |
| 2:00 | 440° F. | Gained |
| 2:30 | 440° F. | Hold until clear solution formed |
| 2:30 | 440° F. | Phthalic anhydride loaded |
| 2:45 | 450° F. | Gained cautiously |
| 4:30 | 450° F. | Butylphenol resin loaded |
| 4:40 | 450° F. | China wood oil loaded |
| 4:50 | 450° F. | 20 CFM carbon dioxide blow |
| 5:20 | 450° F. | 30 CFM carbon dioxide blow Allowed to cool to 425° F. |
| 5:40 | 425° F. | Held |
| 6:30 | 425° F. | Dropped into xylene Thinned with petroleum thinner, | said Table II identified hereinabove and set forth hereinbelow with ingredients and composition weight percent range as follows:

TABLE II

| | Composition |
|---|---|
| Ingredients | Weight Percent, Range |
| Corrosion-preventing soyabean-glycerol alkyd resin (Table I) | 30.00–32.00 |
| Barium metaborate (corrosion preventer compound) | 36.00–38.00 |
| Phenol-formaldehyde (dispersion resin) | 6.00–7.00 |
| Metal compound additives: | |
| titanium dioxide | 5.00–6.00 |
| black iron oxide | 1.00–2.00 |
| magnesium silicate | 5.00–7.50 |
| aluminum silicate | 0.30–0.60 |
| Petroleum thinner | 10.00–12.20 |
| n-Butanol | 0.40–0.80 |
| Naphthenate drying agents: | |
| cobalt naphthenate | 0.10–0.30 |
| manganese naphthenate | 0.10–0.30 |
| iron naphthenate | 0.10–0.30. |

2. The corrosion prevention surface primer coating composition as defined in Table II of claim 1 wherein said composition ingredient weight percents are as set forth in Table III as follows:

TABLE III

| | Composition |
|---|---|
| Ingredients | Weight Percent |
| Corrosion-preventing soyabean-glycerol alkyd resin prepared from ingredients and by manufacture procedure of Table I | 31.10 |
| Barium metaborate (corrosion preventer compound) | 37.15 |
| Phenol-formaldehyde dispersion resin | 6.60 |
| Metal compound additives: | |
| titanium dioxide | 5.45 |
| black iron oxide | 1.45 |
| magnesium silicate | 5.45 |
| aluminum silicate | 0.50 |
| Petroleum thinner | 11.20 |
| n-Butanol | 0.65 |
| Napthenate drying agent: | |
| cobalt naphthenate | 0.15 |
| manganese naphthenate | 0.15 |
| iron naphthenate | 0.15 |
| TOTAL | 100.00. |

* * * * *